S. D. STROHM.
Attachment for Dental Plugging Instruments.

No. 201,849. Patented March 26, 1878.

UNITED STATES PATENT OFFICE.

SAMUEL D. STROHM, OF PHILADELPHIA, PENNSYLVANIA, ASSIGNOR OF ONE-HALF HIS RIGHT TO WILLIAM H. WRIGHT, OF SAME PLACE.

IMPROVEMENT IN ATTACHMENTS FOR DENTAL PLUGGING-INSTRUMENTS.

Specification forming part of Letters Patent No. 201,849, dated March 26, 1878; application filed February 2, 1878.

*To all whom it may concern:*

Be it known that I, SAMUEL D. STROHM, of Philadelphia, Pennsylvania, have invented a new and useful Improvement in Attachments for Dental Plugging-Instruments, of which the following is a specification:

My invention relates to certain improvements in the attachment for dental plugging-instruments for which Letters Patent No. 170,129 were granted to my assignees on the 16th day of November, A. D. 1875; the object of my present invention being to simplify the construction and improve the operation of said attachment.

This object I attain in the following manner, reference being had to the accompanying drawing, in which—

Figure 1:
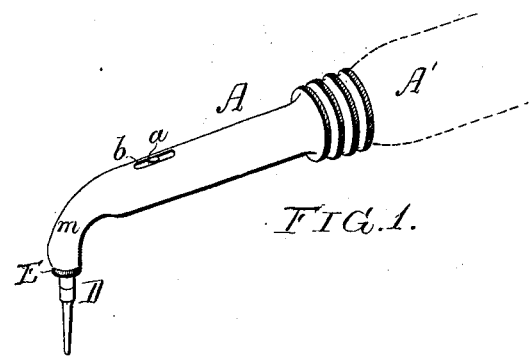
Figure 2:
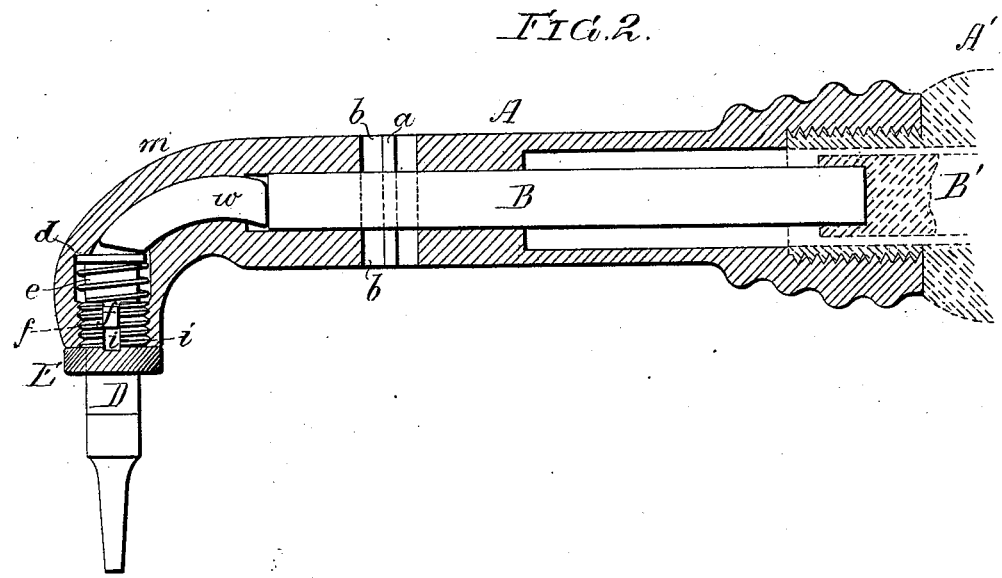

Figure 1 is a perspective view of my improved attachment; and Fig. 2, a longitudinal vertical section of the same, drawn on a larger scale.

In the above-described patented attachment for dental pluggers, a casing having portions at right angles, or thereabout, to each other was combined with two stems, arranged at a similar angle, and a pivoted lever, which intervened between the adjacent ends of the stems, and served to transmit the motion of one to the other. This lever has been found, in practice, to be objectionable in some cases, on account of its size, it being an object of importance in instruments of this class to have the portion which enters the mouth as small as possible.

In order to attain this object I construct the attachment as shown in the drawing, in which A represents a casing, bent at the outer end to the proper angle, and, in the present instance, threaded at the inner end, for attachment to the threaded end of the casing A' of an ordinary straight plugging-instrument, as shown by dotted lines.

That portion of the casing A which is in line with the casing A' carries a stem, B, the inner end of which, in the present instance, fits into a socket in the outer end of the stem B' of the straight plugger when the attachment is applied, as in Fig. 2, the stems B B' being in contact with each other, so as to move simultaneously.

The stem B has a pin, $a$, adapted to slots $b$, formed in the casing A, so that while the said stem B is free to reciprocate to a limited extent, it cannot turn independently of the casing, and cannot be detached from the same, but it is always held in a central position in the casing, thereby insuring its proper relation to the stem B' when the attachment is applied to the casing A'.

The outer bent end of the casing A carries a stem, D, between a head, $d$, on the inner end of which and a screw-plug, E, which closes the end of the casing A, intervenes a coiled spring, $e$, the tendency of which is to retract the stem D. This stem is provided at the outer end with a suitable operating-tool, and has a lug, $f$, which is adapted to a slot, $i$, in the screw-plug E, so that said stem can reciprocate in the casing A, but cannot turn when the operating-tool is being screwed into its outer end.

The curved portion $m$ of the casing A has a central opening of similar shape, and to this opening, is adapted a curved rod, $w$, which fits snugly between the adjacent ends of the stems B and D, so that any forward movement of the stem B is immediately transmitted to the stem D, the rod $w$ sliding through the curved opening, to which it is adapted. As soon as the blow is struck, the spring $e$ causes the backward movement of the stem D, this backward movement being imparted to the stem B through the medium of the rod $w$ in the same manner as the forward movement of the said stem was imparted to the stem D.

By the use of the curved rod $w$ in place of the intermediate lever of the patented device, I am enabled to make the outer end of the casing A very light and neat, thereby effectually overcoming the objection to which said patented device was subject.

The casings A A' may be connected together by other means than screw-threads; but I prefer the latter, and in some cases, also, I prefer to thread the adjacent ends of the stems B B′, so that they will be rigidly connected when the attachment is applied.

I claim as my invention—

1. The combination of the casing A and its stems B and D with the curved rod $w$, adapted to a curved opening in the casing, all substantially as specified.

2. The combination of the stem D and its lug $f$ with the plug E, having a recess, $i$, as specified.

In testimony whereof I have signed my name to this specification in the presence of two subscribing witnesses.

S. D. STROHM.

Witnesses:
  HARRY A. CRAWFORD,
  HARRY SMITH.